UNITED STATES PATENT OFFICE.

CHARLES CLEMENT, OF VALLORBE, SWITZERLAND, ASSIGNOR TO SOCIÉTÉ ANONYME MATTHEY & CO., OF VALLORBE, SWITZERLAND, A CORPORATION OF SWITZERLAND.

ELECTRICAL INSULATING COMPOSITION AND PROCESS FOR MANUFACTURING THE SAME.

No. 833,580. Specification of Letters Patent. Patented Oct. 16, 1906.

Application filed April 21, 1905. Serial No. 256,765.

*To all whom it may concern:*

Be it known that I, CHARLES CLÉMENT, chemist, of Vallorbe, Switzerland, have invented a new and useful Electrical Insulating Composition and a Process for Manufacturing the Same, of which the following is a specification.

The present invention relates to a novel electrical insulating composition and the process for manufacturing the same, and especially refers to the manufacture of electrical and electrochemical apparatus.

The insulating composition according to my invention possesses the advantages of being of great solidity, of a very high electric insulating power, and of being produced at a very low cost. Furthermore, it is water-tight and fireproof and may be heated up to 400° centigrade without deterioration.

Heretofore electrical insulating compositions have generally consisted of wood or celluloid impregnated with paraffin or the like; but such compositions are very inflammable and liable to distort even at a low heat. The insulators manufactured out of sulfate of lime and amianthus easily break and are not impervious to water, but, on the contrary, they absorb water through their pores, which causes their rapid deterioration, as does also extreme changes of temperature, which is not the case when the product resulting from the mixture of amianthus, sulfate of lime, and water is impregnated with pitch.

In carrying out my invention I employ a composition formed by a mixture of amianthus, sulfate of lime, and water, which is then molded to the desired shape or may be spread into plates or sheets of different thicknesses, after which it is allowed to dry and harden. The composition in form is then put into a hot mixture of pitch or other coal-tar derivative to which some sulfur is added. After being thoroughly impregnated it is taken out and allowed to cool. In the carrying out of this process the sulfur acts to vulcanize the pitch, and it is gradually volatilized by the vulcanizing operation and chemical action and the character of the material impregnated is thus changed, thereby increasing its insulating and heat-resisting qualities. The resulting product is of great strength and durability and may be employed for a variety of purposes where an effective and cheap insulating composition is desired.

The essential feature of the new process is that it is to be carried out in two separate operations, in the interval of which the product is allowed to dry and harden. For obtaining the said product it is advantageous to mix ten per cent. of amianthus and ninety per cent. of sulfate of lime with just the necessary amount of water to get a plastic mass, which may be molded in various forms or spread into plates. The material thus obtained is impregnated with pitch and sulfur in a bath of such materials.

I claim as my invention—

1. An insulating composition consisting of amianthus, sulfate of lime, water, pitch and sulfur.

2. The herein-described process for making an insulating composition consisting in mixing amianthus, sulfate of lime and water to a suitable paste, drying the same and then subjecting the product so obtained to impregnation in a bath of pitch and sulfur.

3. The herein-described process for making an insulating composition consisting in mixing ten per cent. of amianthus and ninety per cent. of sulfate of lime with water to make a suitable paste, drying and molding the same and then subjecting the product so obtained to impregnation in a bath of pitch and sulfur.

In testimony whereof I have signed my name to this specification in the presence of two subscribing witnesses.

CHARLES CLÉMENT.

Witnesses:
 G. MERPHRIEM,
 G. GROBET.